US012568371B2

(12) United States Patent
Gonzalez Escudero et al.

(10) Patent No.: US 12,568,371 B2
(45) Date of Patent: Mar. 3, 2026

(54) VERIFIED POSITION INFORMATION

(71) Applicant: Telefonaktiebolaget LM Ericsson (publ), Stockholm (SE)

(72) Inventors: Alberto Gonzalez Escudero, Linköping (SE); Sara Modarres Razavi, Stockholm (SE); Sebastian Lindqvist, Norrköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 474 days.

(21) Appl. No.: 18/169,862

(22) Filed: Feb. 15, 2023

(65) Prior Publication Data

US 2023/0199492 A1     Jun. 22, 2023

Related U.S. Application Data

(62) Division of application No. 16/955,703, filed as application No. PCT/SE2017/051314 on Dec. 20, 2017, now Pat. No. 11,589,234.

(51) Int. Cl.
| | |
|---|---|
| *H04W 76/11* | (2018.01) |
| *H04W 12/06* | (2021.01) |
| *H04W 12/104* | (2021.01) |
| *H04W 64/00* | (2009.01) |

(52) U.S. Cl.
CPC ......... *H04W 12/104* (2021.01); *H04W 12/06* (2013.01); *H04W 64/00* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 7,295,556 | B2 | 11/2007 | Roese et al. |
| 2003/0217122 | A1 | 11/2003 | Roese et al. |
| 2011/0092185 | A1 | 4/2011 | Garskof |

(Continued)

FOREIGN PATENT DOCUMENTS

| | | |
|---|---|---|
| CN | 101627562 A | 1/2010 |
| CN | 105229991 A | 1/2016 |

(Continued)

OTHER PUBLICATIONS

Decision to grant a European patent, EP App. No. 17829731.3, Sep. 1, 2022, 2 pages.

(Continued)

*Primary Examiner* — Suhail Khan
(74) *Attorney, Agent, or Firm* — Nicholson De Vos Webster & Elliott LLP

(57)     ABSTRACT

A method of a wireless communication device of acquiring position information. The method comprises transmitting, to a service-providing node, a request for service, receiving, from the service-providing node, a request for information indicating the position of the wireless communication device, receiving, from a network node, information indicating a position of the wireless communication device, the information having been provided with an indication of authenticity by the network node, and transmitting, to the service-providing node, the position information having been provided with an indication of authenticity.

18 Claims, 10 Drawing Sheets

(56) References Cited

U.S. PATENT DOCUMENTS

| | | | | |
|---|---|---|---|---|
| 2016/0316365 A1* | 10/2016 | Buhler | .................. | H04L 63/083 |
| 2017/0094457 A1 | 3/2017 | Lee | | |
| 2018/0367988 A1 | 12/2018 | Kumar et al. | | |

FOREIGN PATENT DOCUMENTS

| | | | |
|---|---|---|---|
| CN | 107079039 A | 8/2017 |
| WO | 2015/104224 A1 | 7/2015 |
| WO | 2016/006908 A1 | 1/2016 |
| WO | 2016/207017 A1 | 12/2016 |
| WO | 2016/207018 A1 | 12/2016 |

OTHER PUBLICATIONS

First Office Action, CN App. No. 201780097843.X, Mar. 8, 2022, 14 pages (7 pages of English Translation and 7 pages of Original Document).

Intention to grant, EP App. No. 17829731.3, Apr. 22, 2022, 8 pages.

International Preliminary Report on Patentability, PCT App. No. PCT/SE2017/051314, Jul. 2, 2020, 10 pages.

International Search Report and Written Opinion for International Application No. PCT/SE2017/051314, dated Oct. 16, 2018, 15 pages.

Invitation to Pay Additional Fees, PCT App. No. PCT/SE2017/051314, Aug. 20, 2018, 9 pages.

Nokia, "Introduction of LCS QoS Class and indication of achieved accuracy", 3GPP TSG-SA2 Meeting #37, S2-040457, Jan. 12-16, 2004, 36 pages.

Non-Final Office Action, U.S. Appl. No. 16/955,703, Jun. 29, 2022, 10 pages.

Notice of Allowance, U.S. Appl. No. 16/955,703, Oct. 17, 2022, 10 pages.

Office Action, EP App. No. 17829731.3, Sep. 7, 2021, 5 pages.

* cited by examiner

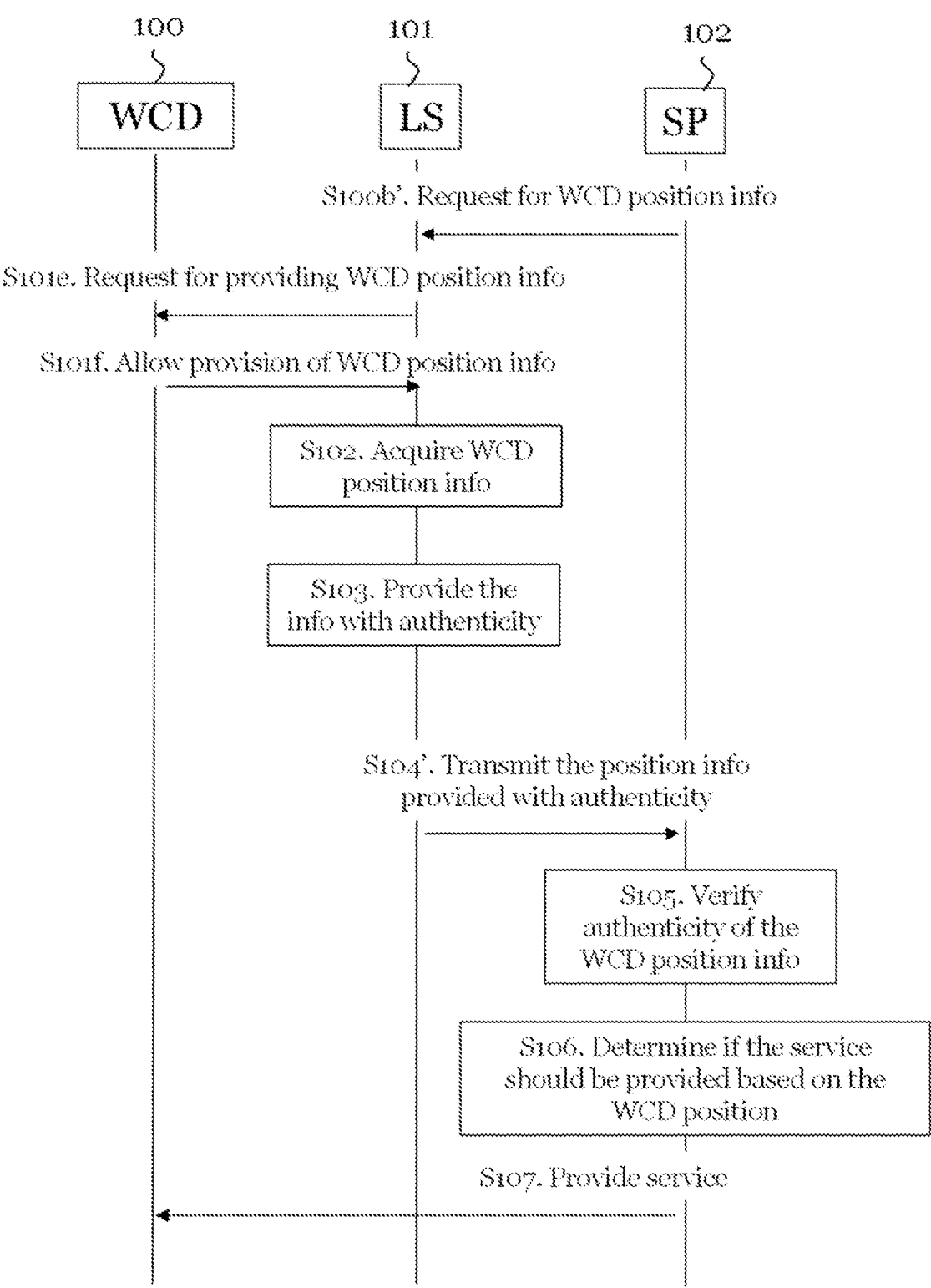

100     101     102

WCD     LS     SP

S100b'. Request for WCD position info

S101e. Request for providing WCD position info

S101f. Allow provision of WCD position info

S102. Acquire WCD position info

S103. Provide the info with authenticity

S104'. Transmit the position info provided with authenticity

S105. Verify authenticity of the WCD position info

S106. Determine if the service should be provided based on the WCD position

S107. Provide service

Fig. 7

VERIFIED POSITION INFORMATION

CROSS-REFERENCE TO RELATED APPLICATIONS

This application is a divisional of U.S. application Ser. No. 16/955,703, filed Jun. 18, 2020, which is a National stage of International Application No. PCT/SE2017/051314, filed Dec. 20, 2017, which are all hereby incorporated by reference.

TECHNICAL FIELD

The invention relates to methods and devices of acquiring position information of a wireless communication device.

BACKGROUND

Positioning of wireless communication devices (WCDs), such as smart phones, tablets, smart watches, gaming devices, Internet-of-Things (IoT) sensors, etc., is becoming ever increasingly important in mobile communication networks. It can be used to enable functionalities, tailor a service or add value to the service.

For instance, if a user resides at a particular geographical location while using an Application ("App") in her smart phone, the App provider may want to know the geographical location of the user in order to provide the user with the requested service via the App. As an example, the user may be utilizing an App where local restaurants are proposed to the user, in which case it is necessary for the App provider to know the user's geographical position.

Currently, WCDs rely mostly on positioning information from GPS ("Global Positioning System") or surrounding wireless networks to estimate the position of the WCD. This position is then typically either used locally in the WCD, or forwarded to a service provider that will use that position information to customize a service.

In a specific case such as in a Long Term Evolution (LTE) communication system, positioning is supported by a WCD—referred to in LTE as a User Equipment (UE)—communicating with a so called Mobility Management Entity (MME) via a base station (referred to as an eNodeB in LTE) using LTE Positioning Protocol (LPP). The MME in its turn sends a Location Service Request to an entity referred to as an Evolved Serving Mobile Location Center (E-SMLC) which returns a UE position estimate to the MME.

A variety of positioning methods can be used in LTE; in the device, in the network or a combination of in the network and in the device. These methods are mostly divided in:

1. Network-based: the network performs the positioning, i.e. the network performs necessary measurements and uses the result to calculate the position of the UE.
2. UE-based: UE performs the positioning with involvement by the network.
3. UE-assisted: the UE measures data needed for positioning, and the network uses the data for computing the position.
4—Network-assisted: the network assists the UE with certain information so the UE can compute the position.

In the case of emergency calls, the emergency services, depending on local legislation, can access the E-SMLC data to locate the UE from which the call is originating.

There are applications, services and use cases which require the position of a WCD in order to deliver, or tailor, certain services, or functionalities to the WCD.

The WCD already has the possibility to report its own position to services based on information from its sensors. However, a WCD—or a malicious party—may report forged position information in order to abuse or manipulate the system, for instance for attaining benefits from a service provider, such as a falsely using an offer associated with a particular geographical area in which the WCD is not located.

SUMMARY

An object of the invention is to solve, or at least mitigate this problem in the art, and thus to provide an improved method of acquiring position information of a wireless communication device.

This object is attained in a first aspect of the invention by a method of a wireless communication device of acquiring position information, comprising transmitting, to a service-providing node, a request for service, receiving, from the service-providing node, a request for information indicating the position of the wireless communication device, receiving, from a network node, information indicating a position of the wireless communication device, the information having been provided with an indication of authenticity by the network node, and transmitting, to the service-providing node, the position information having been provided with an indication of authenticity.

This object is attained in a second aspect of the invention by a method of a wireless communication device configured to acquire position information, comprising a processing unit and a memory, said memory containing instructions executable by said processing unit, whereby the wireless communication device is operative to transmit, to a service-providing node, a request for service, receive, from the service-providing node, a request for information indicating the position of the wireless communication device, receive, from a network node, information indicating a position of the wireless communication device, the information having been provided with an indication of authenticity by the network node, and transmit, to the service-providing node, the position information having been provided with an indication of authenticity.

This object is attained in a third aspect of the invention by a method of a wireless communication device of acquiring position information, comprising transmitting, to a network node, a request for information indicating the position of the wireless communication device, receiving, from the network node, information indicating a position of the wireless communication device, the information having been provided with an indication of authenticity by the network node, and verifying the authenticity of the received position information.

This object is attained in a fourth aspect of the invention by a wireless communication device configured to acquire position information, comprising a processing unit and a memory, said memory containing instructions executable by said processing unit, whereby the wireless communication device is operative to transmit, to a network node, a request for information indicating the position of the wireless communication device, receive, from the network node, information indicating a position of the wireless communication device, the information having been provided with an indication of authenticity by the network node, and verify the authenticity of the received position information.

This object is attained in a fifth aspect of the invention by a method of a method of a network node of acquiring position information, comprising acquiring information indicating position of a wireless communication device, providing the information indicating the position of the wireless communication device with an indication of authenticity, and transmitting the position information having been provided with an indication of authenticity to at least one recipient.

This object is attained in a sixth aspect of the invention by a network node configured to acquire position information, comprising a processing unit and a memory, said memory containing instructions executable by said processing unit, whereby the network node is operative to acquire information indicating position of a wireless communication device, provide the information indicating the position of the wireless communication device with an indication of authenticity, and transmit the position information having been provided with an indication of authenticity to at least one recipient.

This object is attained in a seventh aspect of the invention by a method of a service-providing node configured to provide a service to a wireless communication device, comprising transmitting a request for information indicating a position of the wireless communication device, receiving information indicating a position of the wireless communication device, the information having been provided with an indication of authenticity, verifying the authenticity of the received position information, determining if the position information allows the service to be provided, and if so providing the service to the wireless communication device (100).

This object is attained in a eight aspect of the invention by a method of a service-providing node configured to provide a service to a wireless communication device, comprising a processing unit and a memory, said memory containing instructions executable by said processing unit, whereby the service-providing node is operative to transmit a request for information indicating a position of the wireless communication device, receive information indicating a position of the wireless communication device, the information having been provided with an indication of authenticity, verify the authenticity of the received position information, determine if the position information allows the service to be provided, and if so provide the service to the wireless communication device.

Advantageously, by having a trusted network node, such as e.g. an MME or a base station—i.e. a network node being capable of fetching, measuring or estimating a position of a wireless communication either on behalf of the wireless communication device itself, or a service-providing node—provide the position information with an indication of authenticity, such as e.g. digital signature, it is possible for the wireless communication device/service-providing node to verify that a trusted party actually has provided the position information.

In an embodiment, the wireless communication device transmits, to the network node, a request for information indicating a position of the wireless communication device.

In another embodiment, the information indicating a position of the wireless communication device, and having been provided with an indication of authenticity by the network node, is received at the wireless communication device via broadcast or unicast, or via a System Information Block (SIB).

In another embodiment, the transmitting to the service-providing node of the position information further comprises transmitting an identifier of the network node having provided the indication of authenticity.

In an embodiment, the requested service is received upon the service-providing node verifying the authenticity of the received position information.

In yet an embodiment, the wireless communication device itself estimates the position, wherein the transmitting to the service-providing node of the position information having been provided with an indication of authenticity, and the identifier of the network node having provided the authenticity, further comprises transmitting information indicating the position estimated by the wireless communication device.

In an embodiment, the network node receives, from the wireless communication device, a request for the information indicating the position of the wireless communication device.

In an embodiment, the recipient of the position information is the wireless communication device, wherein the wireless communication device verifies the authenticity of the position information before accessing said position information.

In an embodiment, the recipient of the position information is the wireless communication device, wherein the wireless communication device forwards the position information to a service-providing node configured to provide a service to the wireless communication device, the service-providing-node verifying the authenticity of the position information before providing said service.

In a further embodiment, the recipient of the position information is the service-providing node configured to provide a service to the wireless communication device, wherein the service-providing node verifies the authenticity of the position information before providing said service.

In an other embodiment, the network node receives, from the service-providing node, a request for information indicating a position of the wireless communication device, transmits a request to allow the service-providing node to obtain the information indicating the position of the wireless communication device receive a response from the wireless communication device as to whether the information indicating the position of the wireless communication device can be provided to the service-providing node or not, wherein the position information having been provided with an indication of authenticity is transmitted to the service-providing node only if the response indicates that the service-providing node is allowed to obtain the information.

In a further embodiment, the network node receives, from the wireless communication device, a request for credentials required to receive the information indicating the position of the wireless communication device, transmitting, to the wireless communication device, the requested credentials, receiving, from a service-providing node configured to provide a service to the wireless communication device, a request for the information indicating the position of the wireless communication device, and said credentials; wherein the information indicating position of the wireless communication device is acquired and provided with an indication of authenticity if the credentials received from the service-providing node match the credentials transmitted to the wireless communication device, the transmitting of the position information having been provided with an indication of authenticity comprising transmitting the position information having been provided with an indication of authenticity to the service-providing node.

In a further embodiment, the network node receives, from the wireless communication device, a list of service-providing nodes being allowed to receive the information indicating the position of the wireless communication device, receives, from a service-providing node configured to provide a service to the wireless communication device, a request for the information indicating the position of the wireless communication device, wherein the information indicating position of the wireless communication device is acquired and provided with an indication of authenticity if the requesting a service-providing node is on the list, the transmitting of the position information having been provided with an indication of authenticity comprising transmitting the position information having been provided with an indication of authenticity to the service-providing node (102).

In an embodiment, the request for information from the service-providing node indicating a position of the wireless communication device is transmitted to the wireless communication device and the position information having been provided with an indication of authenticity, and an identifier of a network node having provided the indication of authenticity, is received from the wireless communication device.

In another embodiment, the request for information from the service-providing node indicating a position of the wireless communication device is transmitted to the wireless communication device and the position information having been provided with an indication of authenticity by a network node is received from the network node.

In still an embodiment, the request for information from the service-providing node indicating a position of the wireless communication device is transmitted to a network node and the position information having been provided with an indication of authenticity by the network node is received from the network node.

In yet an embodiment, the service-providing node receives, from the wireless communication device, credentials required to receive the information indicating the position of the wireless communication device (100), and transmits, to the network node, the request for the information indicating the position of the wireless communication device, and said credentials; wherein the information indicating position of the wireless communication device provided with an indication of authenticity is received if the credentials are verified by the network node.

In another embodiment, the service-providing node receives, from the wireless communication device, a request for service being based on the position of the wireless communication device.

In a further embodiment, the information indicating a position of the wireless communication device is provided with authenticity by means of utilizing a cryptographic key, and any verification of the provided authenticity is performed using a corresponding cryptographic key.

In a ninth aspect of the invention, a computer program is provided comprising computer-executable instructions for causing a wireless communication device to perform steps recited in the method of the first aspect when the computer-executable instructions are executed on a processing unit included in the wireless communication device.

In a tenth aspect of the invention, a computer program product is provided comprising a computer readable medium, the computer readable medium having the computer program of the ninth aspect embodied thereon.

In an eleventh aspect of the invention, a computer program is provided comprising computer-executable instructions for causing a wireless communication device to perform steps recited in the method of the third aspect when the computer-executable instructions are executed on a processing unit included in the wireless communication device.

In a twelfth aspect of the invention, a computer program product is provided comprising a computer readable medium, the computer readable medium having the computer program of the eleventh aspect embodied thereon.

In a thirteenth aspect of the invention, a computer program is provided comprising computer-executable instructions for causing a network node to perform steps of the method of the fifth aspect when the computer-executable instructions are executed on a processing unit included in the network node.

In a fourteenth aspect of the invention, a computer program product is provided comprising a computer readable medium, the computer readable medium having the computer program of the thirteenth aspect embodied thereon.

In a fifteenth aspect of the invention, a computer program is provided comprising computer-executable instructions for causing a service-providing node to perform steps recited in the method of the seventh aspect when the computer-executable instructions are executed on a processing unit included in the service-providing node.

In a sixteenth aspect of the invention, a computer program product is provided comprising a computer readable medium, the computer readable medium having the computer program of the fifteenth aspect embodied thereon.

Further embodiments will be discussed in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 7 illustrates a signalling diagram of a method of acquiring position information of a WCD according to still a further embodiment;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
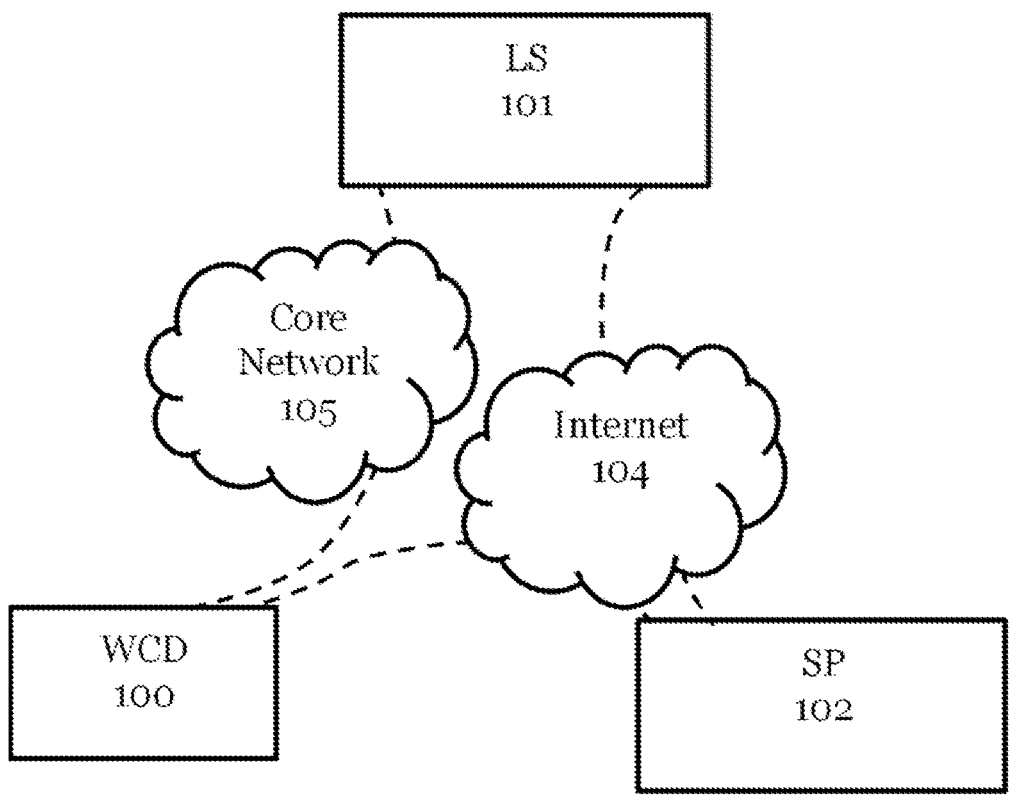
FIG. 1 illustrates a communication system according to an embodiment.

FIG. 1 illustrates a communication system according to an embodiment comprising a wireless communication device (WCD) 100 a network node 101 referred to in this example as a location server 101, and further a service provider node 102, all communicating by some appropriate means such as the Internet 104 for the WCD 100 and the location server 101 communicating with the service provider 102, and a core network 105 for the WCD 100 and the location server 101 communicating with each other. The network node may be embodied by any appropriate network node, such as a location server, a base station, an MME, etc.

For instance, the WCD 100 is a smart phone on which a user wishes to use a particular App provided by the service provider 102, and the App—or the service provider 102 requires a particular geographical location of the WCD 100 in order to provide a requested service. As an example, the App provides online shopping facilities where a special low-price offer is made to new customers residing within a particular geographical area. Hence, the App or the service provider 102 requires the (unforged) geographical position of the WCD 100.

Figure 2:
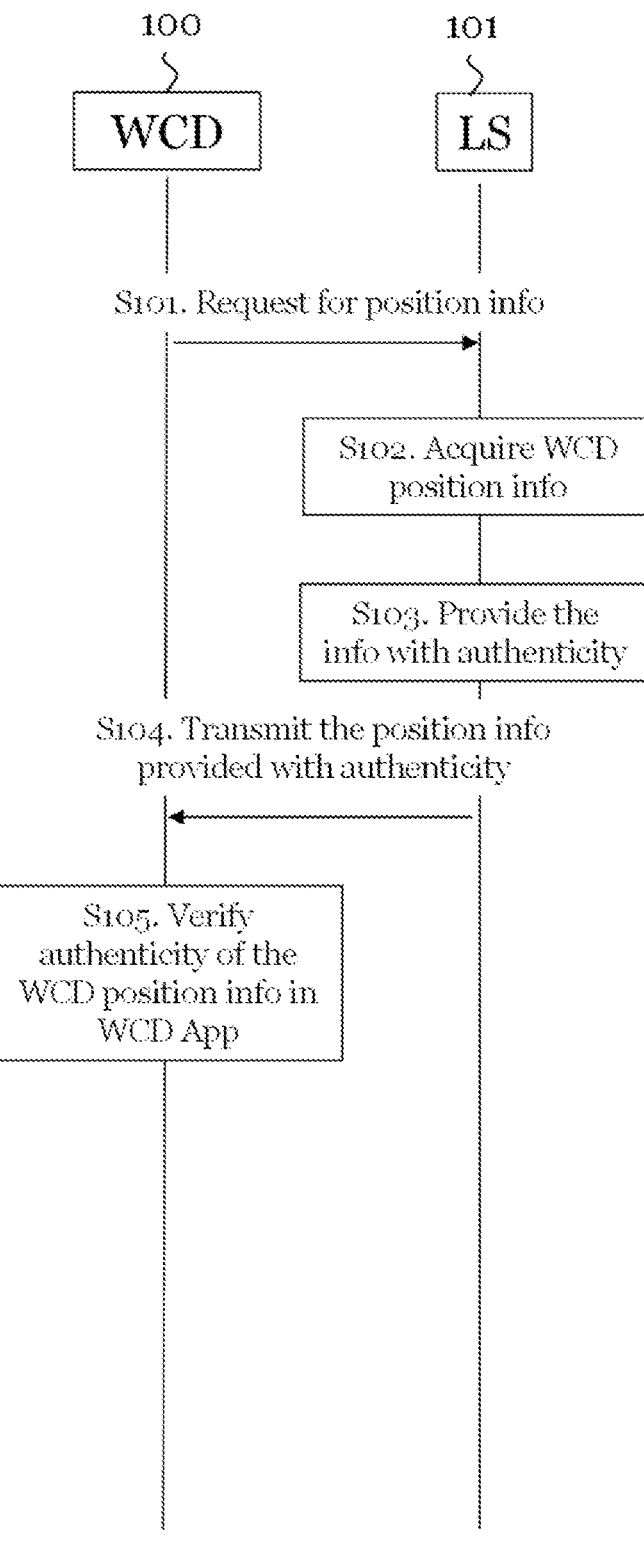
FIG. 2 illustrates a signalling diagram of a method of acquiring position information of a WCD according to an embodiment.

FIG. 2 illustrates a signalling diagram of a method of acquiring position information of the WCD 100 according to an embodiment.

In this embodiment, the WCD 100 transmits in step S101 a request to the location server (LS) 101 to receive WCD position information, for example in the form of geographical coordinates.

The WCD position information provided by the LS 101 can be given based on relatively crude knowledge of the WCD, for example the location of the service cell or by using other network based positioning methods such as Observed Time Difference of Arrival (OTDOA), Enhanced Cell ID (ECID) or fingerprinting (AECID) to provide a higher WCD position accuracy.

Upon receiving the request, the location server 101 acquires information indicating the WCD position, e.g. from an E-SMLC in the case of LTE, in step S102.

Thereafter, in step S103, the location server 102 provides the acquired WCD position information with an indication of authenticity, such that the WCD position information can be trusted.

The indication of authenticity may be provided by the location server 102 in many different ways, for instance:

1. Encrypting the WCD position information with a secret symmetric key to which a recipient of the encrypted WCD position information must have access in order to verify the authenticity of the received data.
2. Providing the WCD position information with a message authentication code (MAC) to be verified by a recipient. As in the previous example, utilizing a MAC also involves using a symmetric key to which both the creator of the MAC and the recipient must have access.

3. Digitally signing the WCD position information, i.e. encrypting the WCD position information with a secret private asymmetric key, wherein a recipient of the encrypted WCD position information must have access to a corresponding public key in order to verify the authenticity of the received data.
4. Using a cryptographic protocol such as Transport Layer Security (TLS) or Secure Sockets Layer (SSL).

In the following examples, the indication of authenticity is provided by means of encrypting the WCD position information using a symmetric key $K_S$, which is denoted:

$$M=E_{Ks}(WCD_{POS}),$$

even though many different methods may be envisaged, as discussed hereinabove.

Message M is then transmitted to the WCD 100 in step S104.

In this particular exemplifying embodiment, an App installed in the WCD 100 will use the WCD position information to determine a geographical position of the WCD 100. Hence, the App—which may be preconfigured with the key $K_S$—decrypts the encrypted message M using the symmetric key $K_S$, which is denoted:

$$WCD_{POS}=D_{Ks}(M).$$

The WCD position information has thus been verified at the App in the WCD 100 and can be used for providing the requested service.

Figure 3:
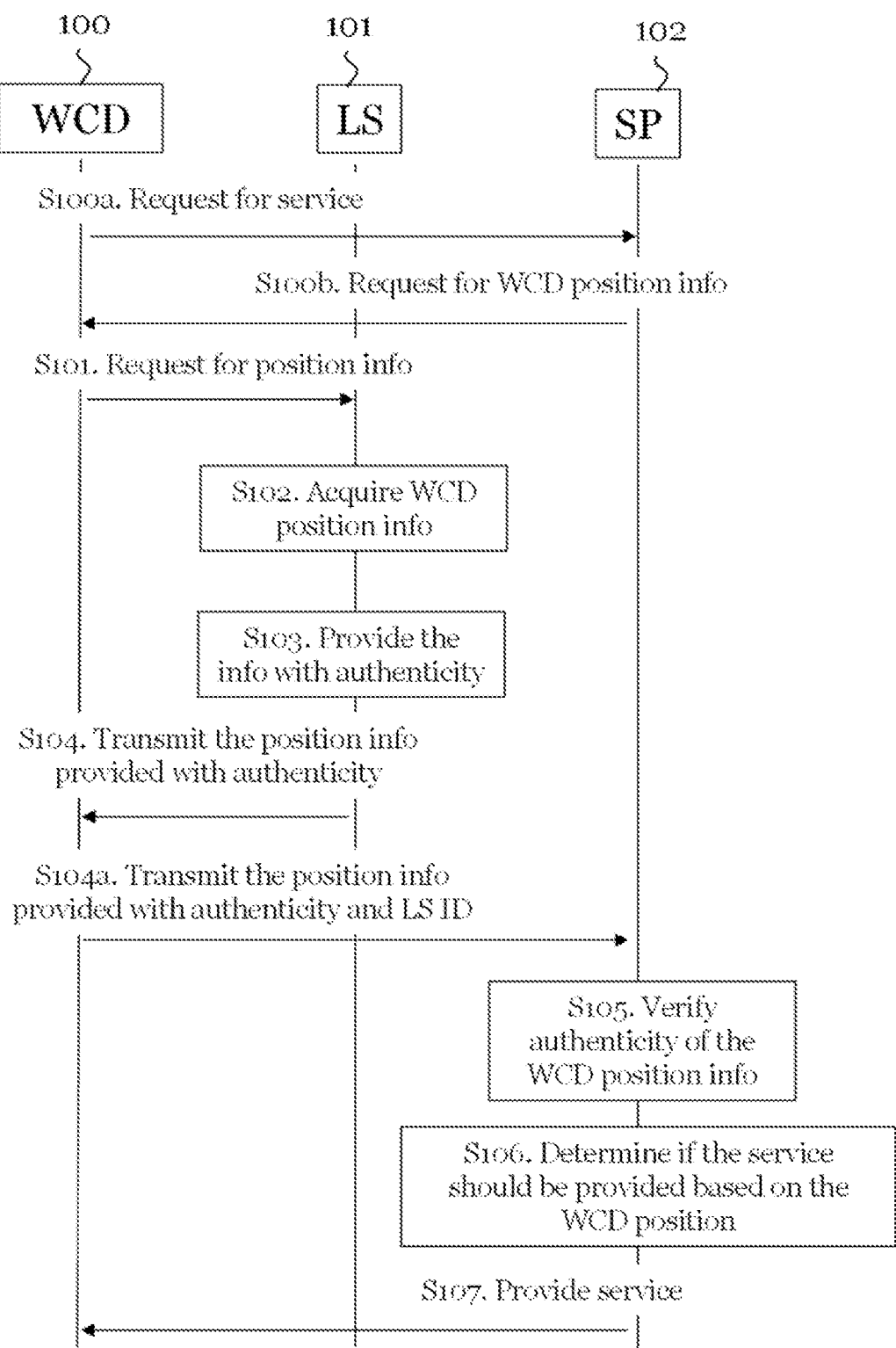
FIG. 3 illustrates a signalling diagram of a method of acquiring position information of a WCD according to another embodiment.

FIG. 3 illustrates a signalling diagram of a method of acquiring position information of the WCD 100 according to another embodiment.

In this embodiment, the WCD 100 communicates with an external service provider (SP). This communication may occur directly from the WCD 100 or via an App of the SP 102 implemented in the WCD 100. Hence, the WCD 100 sends a request for service in step 100*a* to the SP102 (possibly by operating the App), to which request the SP 102 will reply by transmitting a request to the WCD 100 to receive WCD position information.

The WCD 100 in its turn forwards the WCD position information request to the LS 101 in step S101.

Upon receiving the request, the location server 101 acquires information indicating the WCD position in step S102.

Thereafter, in step S103, the location server 102 provides the acquired WCD position information with an indication of authenticity, such that the WCD position information can be trusted, resulting in $M=E_{Ks}(WCD_{POS})$.

Message M is then transmitted to the WCD 100 in step S104, which forwards the message M to the SP 102 in step S104*a* (possibly via an App installed in the WCD) along with an identifier of the LS 101 having provided the indication of authenticity.

It is noted that the WCD 100 may be aware of the LS ID, or may receive the LS ID in step S104. The LS ID is required by the SP 102 such that the symmetric key $K_S$ of this particular LS 101 can be acquired. Typically, the SP 102 would hold a plurality of symmetric keys associated with different network nodes being capable of providing WCD position information.

The SP 102—which may be preconfigured with the key $K_S$—decrypts the encrypted message M using the symmetric key $K_S$: $WCD_{POS}=D_{Ks}(M)$ associated with the LS ID.

The WCD position information has thus been verified at the SP 102 and the SP 102 determines in step S106 whether the WCD position allows the service to be provided or not. For instance, the SP 102 may determine whether the WCD resides within a certain area and if so, the requested service associated with the WCD position is provided to the WCD 100 in step S107.

In an embodiment, the WCD 100 estimates its own position and transmits the estimated position along with the encrypted position information to the SP102 in step S104$a$, wherein the SP 102 may evaluate the estimated position to determine whether the requested service should be provided or not. For instance, the estimated position should be sufficiently similar to the position acquired by the LS 101.

Figure 4:
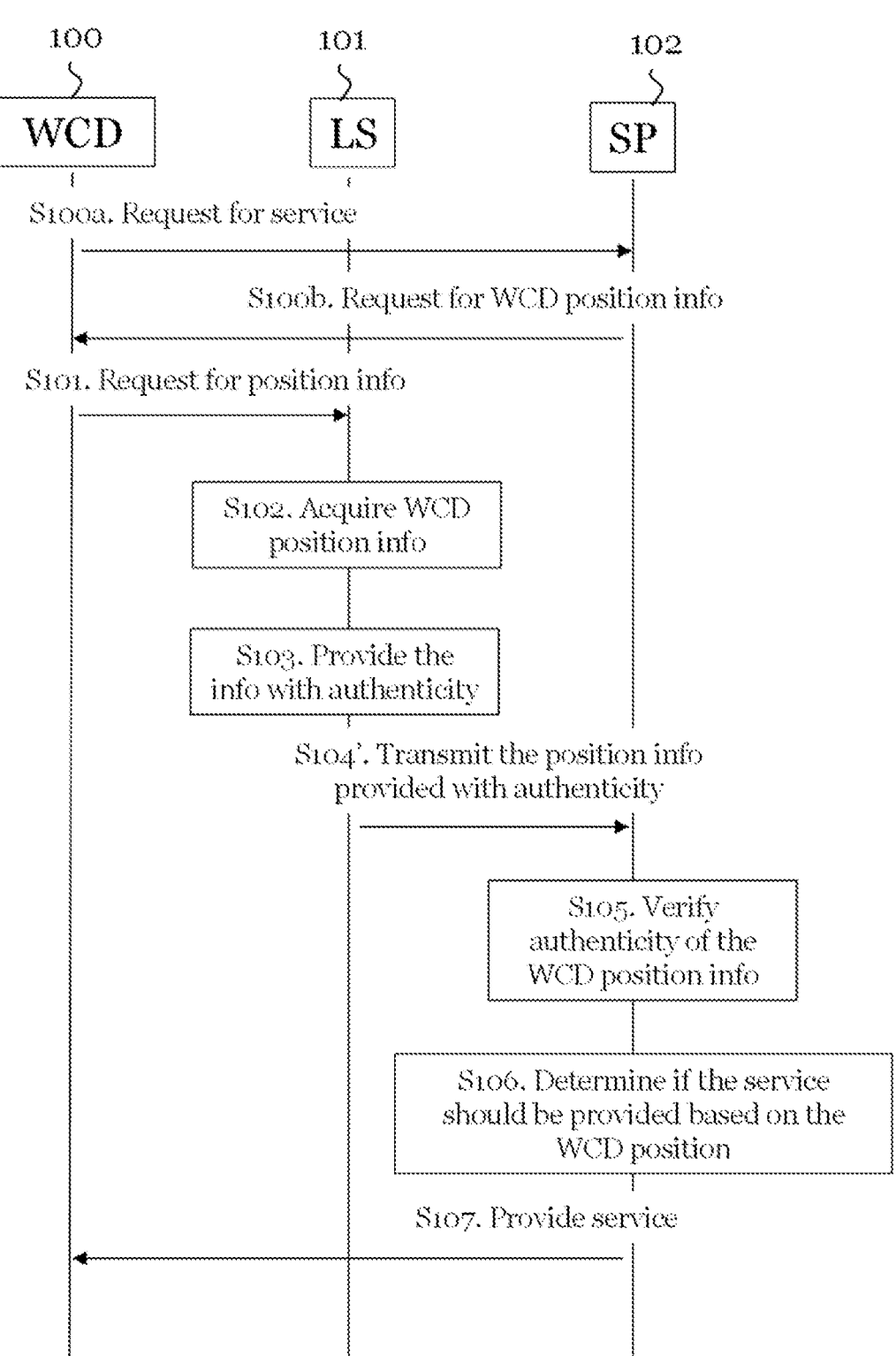
FIG. 4 illustrates a signalling diagram of a method of acquiring position information of a WCD according to a further embodiment.

FIG. 4 illustrates a signalling diagram of a method of acquiring position information of the WCD 100 according to a further embodiment. In contrast to the embodiment described with reference to FIG. 3, after having acquired information indicating the WCD position and provided the information with authenticity in step S103—resulting in M=E$_{Ks}$(WCD$_{POS}$)—the message M is transmitted directly to the SP 102 in step S104'.

It is noted that in the case the SP 102 has direct contact with the LS 101, it is typically not necessary to explicitly send an LS ID, since the SP 102 in general can derive the identity of the LS 101 from the established connection. This is also true for the WCD 100 in the embodiment described with reference to FIG. 2.

As previously described, the SP 102 decrypts the encrypted message M using the symmetric key K$_S$: WCD$_{POS}$=D$_{Ks}$(M) associated with the LS 101.

The WCD position information has thus been verified at the SP102 and the SP 102 determines in step S106 whether the WCD position allows the service to be provided or not. For instance, the SP 102 may determine whether the WCD resides within a certain area and if so, the requested service associated with the WCD position is provided to the WCD 100 in step S107.

In the embodiments described with reference to FIGS. 2-4, the WCD 100 explicitly makes a request for position information to the LS 101. However, in an alternative embodiment, the position information (having been provided with authenticity) for a particular WCD 100 may be provided by the LS 101 via broadcast. For instance, each WCD within a certain area is provided with its position information via broadcast or unicast or in a System Information Block (SIB). This is advantageous since the WCD(s) would not have to send a specific request to an LS. The encryption keys may also be handled in this way.

Figure 5:
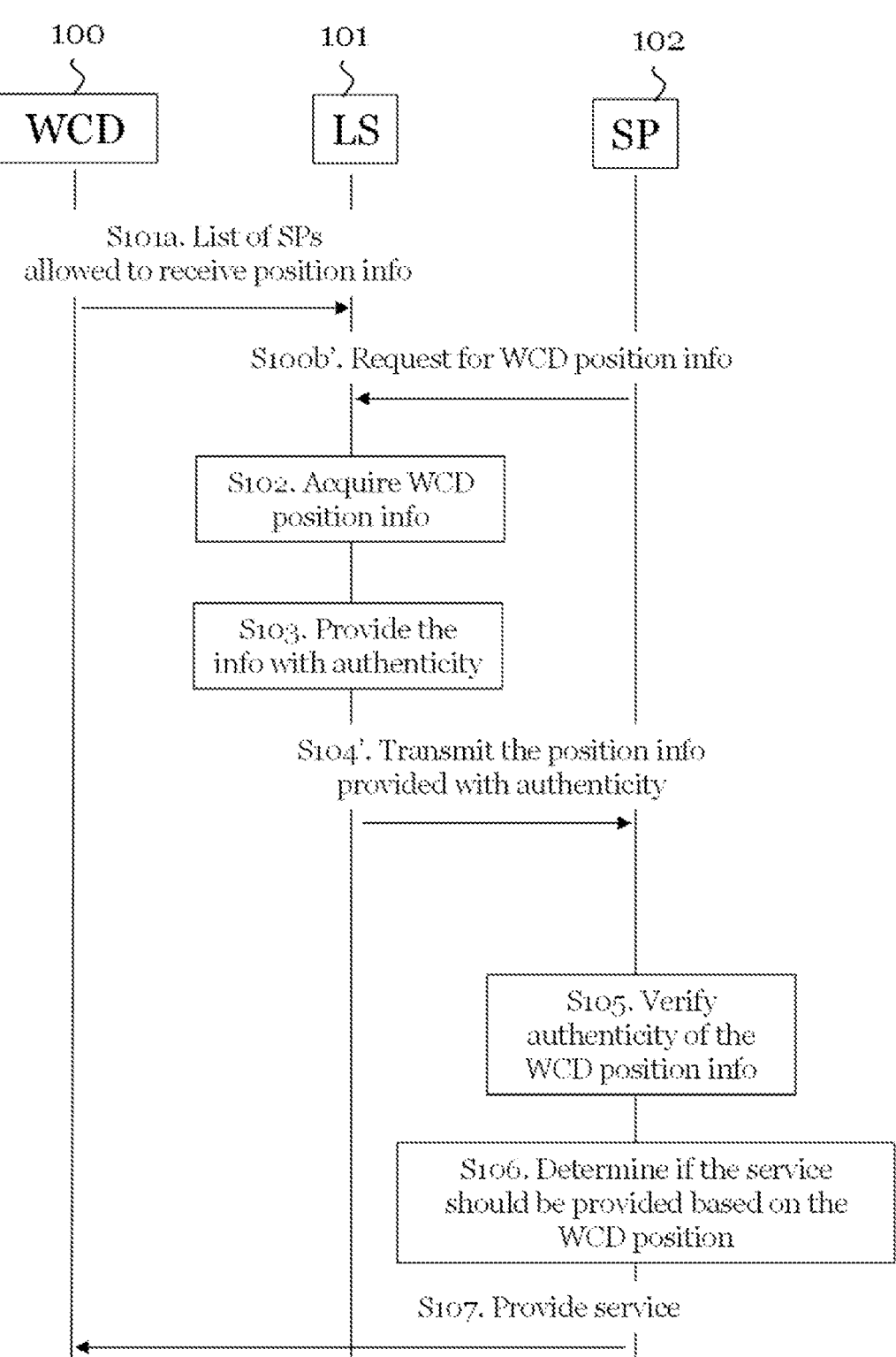
FIG. 5 illustrates a signalling diagram of a method of acquiring position information of a WCD according to yet another embodiment.

FIG. 5 illustrates a signalling diagram of a method of acquiring position information of the WCD 100 according to yet another embodiment.

In this embodiment, the WCD 100 transmits a list of SPs which should be given access to WCD position information in step S101$a$ (in response to which the LS 101 may or may not send an acknowledgement message).

In an optional embodiment, the list may be complemented with further information regarding for instance a time period during which the SPs will be given access to the WCD position information, or at how many occasions they will be given access.

The SP 102 transmits a request to the LS 101 in step S100$b'$ to receive WCD position information, and if the SP 102 is on the list of SPs (and optionally if the time period has not expired) received by the LS 101, the LS 101 acquires information indicating the WCD position in step S102. It is noted that the request from the SP102 in step S100$b'$ may have been preceded by the WCD 100 requesting a service from the SP 102.

Thereafter, in step S103, the LS 102 provides the acquired WCD position information with an indication of authenticity, such that the WCD position information can be trusted, resulting in M=E$_{Ks}$(WCD$_{POS}$).

Message M is then transmitted to the SP 102 in step S104' (optionally along with an identifier of the LS 101 having provided the indication of authenticity).

The SP 102—which may be preconfigured with the key K$_S$—decrypts the encrypted message M using the symmetric key K$_S$: WCD$_{POS}$=D$_{Ks}$(M) in step S105.

The WCD position information has thus been verified at the SP102 and the SP 102 determines in step S106 whether the WCD position allows the service to be provided or not. For instance, the SP 102 may determine whether the WCD resides within a certain area and if so, a service associated with the WCD position is provided to the WCD 100 in step S107.

Figure 6:
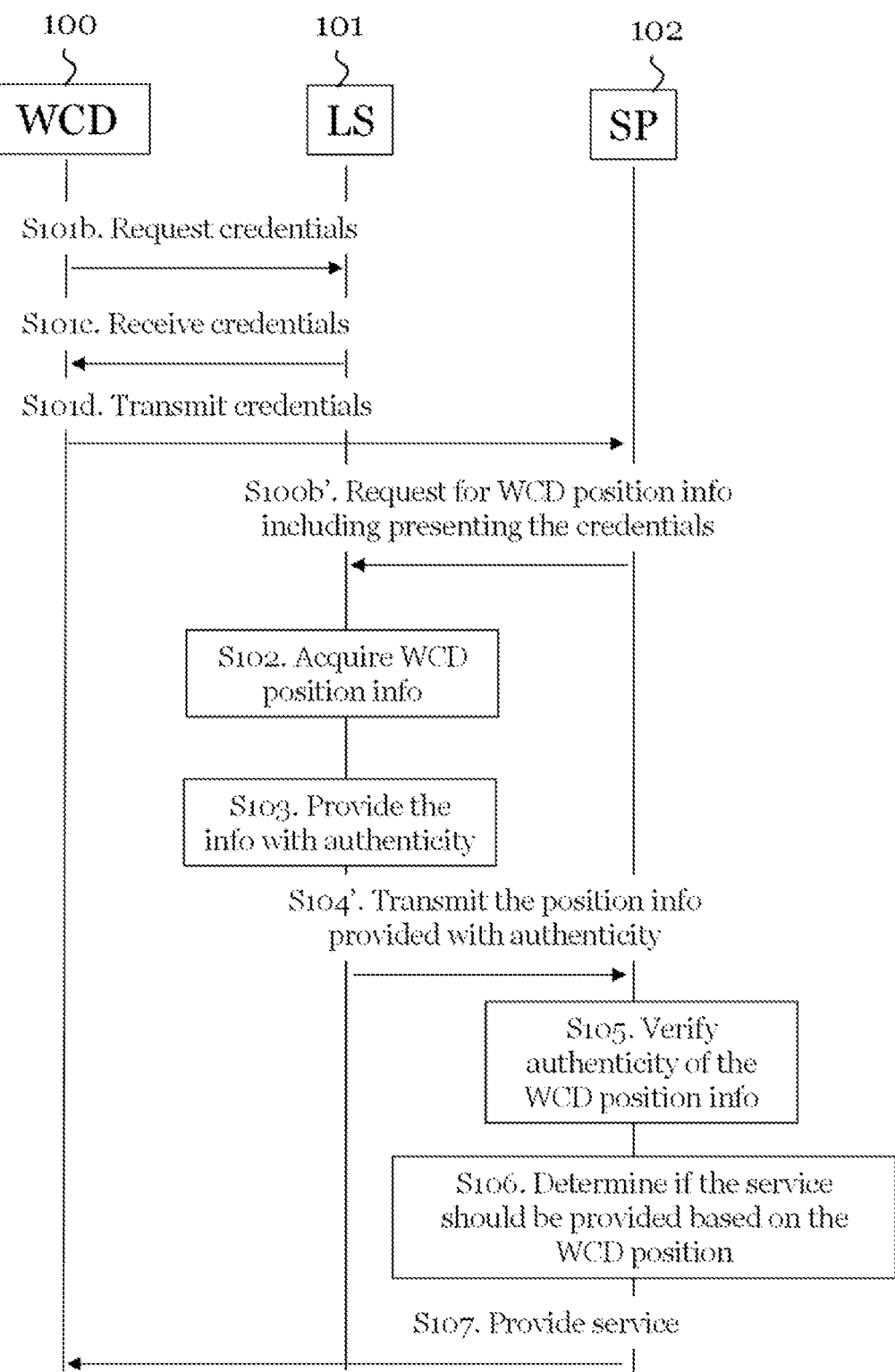
FIG. 6 illustrates a signalling diagram of a method of acquiring position information of a WCD according to still another embodiment.

FIG. 6 illustrates a signalling diagram of a method of acquiring position information of the WCD 100 according to still another embodiment.

In this embodiment, as compared to the embodiment illustrated with reference to FIG. 5, the level of security is raised in that the WCD 100 requests login credentials from the LS 101 in step S101$b$. The requested credentials are delivered to the WCD 100 in step S101$c$ and could include e.g. user/password combination, token or certificate required by the SP 102 for subsequently receiving WCD position information from the LS 101.

Thereafter, in step S101$d$, the credentials are transmitted by the WCD 100 to the SP 102. The SP 102 will thus in step S100$b'$, when requesting WCD position information, present the credentials to the LS 101, and if they are valid, the LS 101 acquires information indicating the WCD position in step S102. Again, it is noted that the request from the SP102 in step S100$b'$ may have been preceded by the WCD 100 requesting a service from the SP 102.

Then, in step S103, the LS 102 provides the acquired WCD position information with an indication of authenticity, such that the WCD position information can be trusted, resulting in M=E$_{Ks}$(WCD$_{POS}$).

Message M is then transmitted to the SP 102 in step S104' (optionally along with an identifier of the LS 101 having provided the indication of authenticity).

The SP 102—which may be preconfigured with the key K$_S$—decrypts the encrypted message M using the symmetric key K$_S$: WCD$_{POS}$=D$_{Ks}$(M) in step S105.

The WCD position information has thus been verified at the SP102 and the SP 102 determines in step S106 whether the WCD position allows the service to be provided or not. For instance, the SP 102 may determine whether the WCD resides within a certain area and if so, a service associated with the WCD position is provided to the WCD 100 in step S107.

FIG. 7 illustrates a signalling diagram of a method of acquiring position information of the WCD 100 according to still a further embodiment.

In this embodiment, the WCD 100 will give permission to the LS 101 to provide the WCD position information to the SP 102. The SP 102 requests WCD position information from the LS 101 in step S100$b'$, which in its turn forwards the request to the WCD 100 in step S101$e$.

The WCD 10$o$ sends a message allowing (or not allowing) the LS 101 to provide the information indicating the WCD position in step S101$f$.

Upon receiving the message, the location server 101 acquires information indicating the WCD position in step S102.

Thereafter, in step S103, the location server 102 provides the acquired WCD position information with an indication of authenticity, such that the WCD position information can be trusted, resulting in $M=E_{K_S}(WCD_{POS})$.

Message M is then transmitted to the SP 102 in step S104'.

The SP 102—which may be preconfigured with the key $K_S$—decrypts the encrypted message M using the symmetric key $K_S$: $WCD_{POS}=D_{K_S}(M)$ in step S105.

The WCD position information has thus been verified at the SP102 and the SP 102 determines in step S106 whether the WCD position allows the service to be provided or not. For instance, the SP 102 may determine whether the WCD resides within a certain area and if so, a service associated with the WCD position is provided to the WCD 100 in step S107.

As can be concluded from the above described embodiments, a reliable and non-spoofable network-based position information provision service is proposed. The WCD(s) may request the network to provide positioning information and/or be able to control whom the information is shared with. This information can be cryptographically protected, preventing alteration and allowing for verification by services and third parties.

Figure 8:
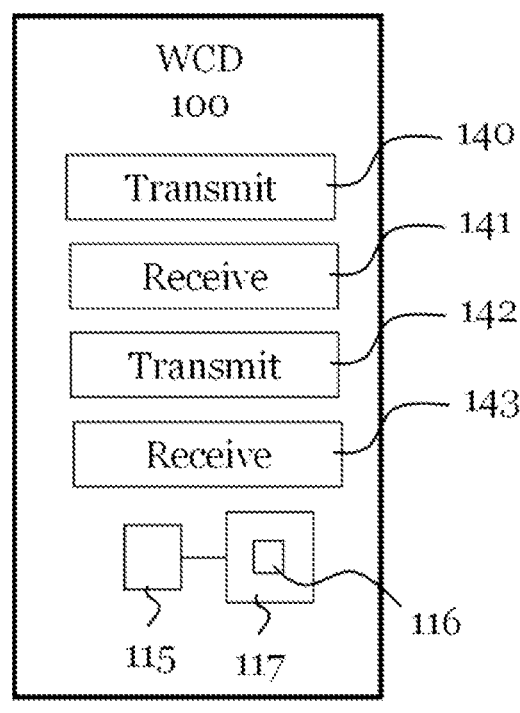
FIG. 8 illustrates a WCD according to an embodiment.

FIG. 8 illustrates a WCD 100 according to an embodiment. The steps of the method performed by the wireless communication device 100 of acquiring position information according to embodiments are in practice performed by a processing unit 115 embodied in the form of one or more microprocessors arranged to execute a computer program 116 downloaded to a suitable storage volatile medium 117 associated with the microprocessor, such as a Random Access Memory (RAM), or a non-volatile storage medium such as a Flash memory or a hard disk drive. The processing unit 115 is arranged to cause the wireless communication device 101 to carry out the method according to embodiments when the appropriate computer program 116 comprising computer-executable instructions is downloaded to the storage medium 117 and executed by the processing unit 115. The storage medium 117 may also be a computer program product comprising the computer program 116. Alternatively, the computer program 116 may be transferred to the storage medium 117 by means of a suitable computer program product, such as a Digital Versatile Disc (DVD) or a memory stick. As a further alternative, the computer program 116 may be downloaded to the storage medium 117 over a network. The processing unit 115 may alternatively be embodied in the form of a digital signal processor (DSP), an application specific integrated circuit (ASIC), a field-programmable gate array (FPGA), a complex programmable logic device (CPLD), etc.

The wireless communication device 101 comprises transmitting means 140 adapted to transmit, to a service-providing node, a request for service, receiving means 141 adapted receive, from the service-providing node, a request for information indicating the position of the wireless communication device, receiving means 142 adapted to receive, from a network node, information indicating a position of the wireless communication device, the information having been provided with an indication of authenticity by the network node, and transmitting means adapted to transmit, to the service-providing node, the position information having been provided with an indication of authenticity.

Figure 9:
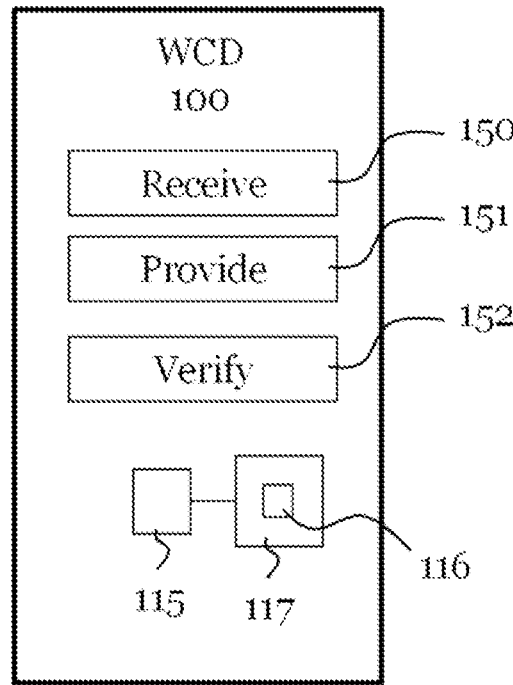
FIG. 9 illustrates a WCD according to another embodiment.

FIG. 9 illustrates a WCD 100 according to another embodiment. The WCD comprises transmitting means 150 adapted to transmit, to a network node, a request for information indicating the position of the wireless communication device, receiving means 151 adapted to receive, from the network node, information indicating a position of the wireless communication device, the information having been provided with an indication of authenticity by the network node, and verifying means 152 adapted to verify the authenticity of the received position information.

The means 140-142 and 150-151 may comprise communication interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 10:
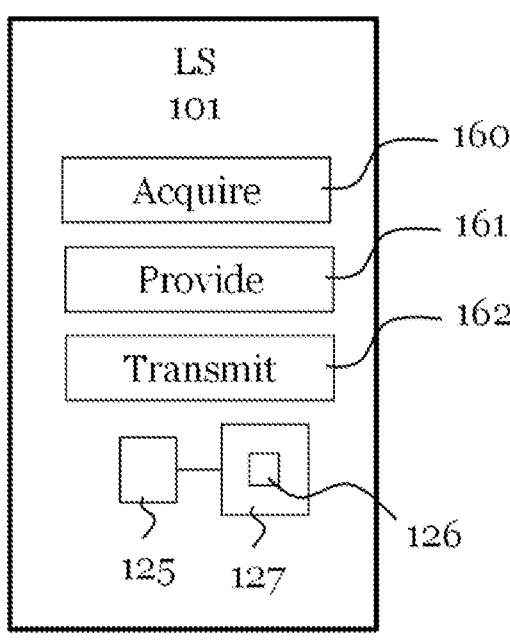
FIG. 10 illustrates a network node according to an embodiment.

FIG. 10 illustrates a network node 101 according to an embodiment such as a location server (LS). The steps of the method performed by the LS 101 of acquiring position information according to embodiments are in practice performed by a processing unit 125 embodied in the form of one or more microprocessors arranged to execute a computer program 126 downloaded to a suitable storage volatile medium 127 associated with the microprocessor, such as a Random Access Memory (RAM), or a non-volatile storage medium such as a Flash memory or a hard disk drive. The processing unit 125 is arranged to cause the LS 101 to carry out the method according to embodiments when the appropriate computer program 126 comprising computer-executable instructions is downloaded to the storage medium 127 and executed by the processing unit 125. The storage medium 127 may also be a computer program product comprising the computer program 126. Alternatively, the computer program 126 may be transferred to the storage medium 127 by means of a suitable computer program product, such as a Digital Versatile Disc (DVD) or a memory stick. As a further alternative, the computer program 126 may be downloaded to the storage medium 127 over a network. The processing unit 125 may alternatively be embodied in the form of a digital signal processor (DSP), an application specific integrated circuit (ASIC), a field-programmable gate array (FPGA), a complex programmable logic device (CPLD), etc.

The LS 101 comprises acquiring means 160 adapted to acquire information indicating position of a wireless communication device, providing means 161 adapted to provide the information indicating the position of the wireless communication device with an indication of authenticity, and transmitting means 162 adapted to transmit the position information having been provided with an indication of authenticity to at least one recipient.

The means 160-162 may comprise communications interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 11:
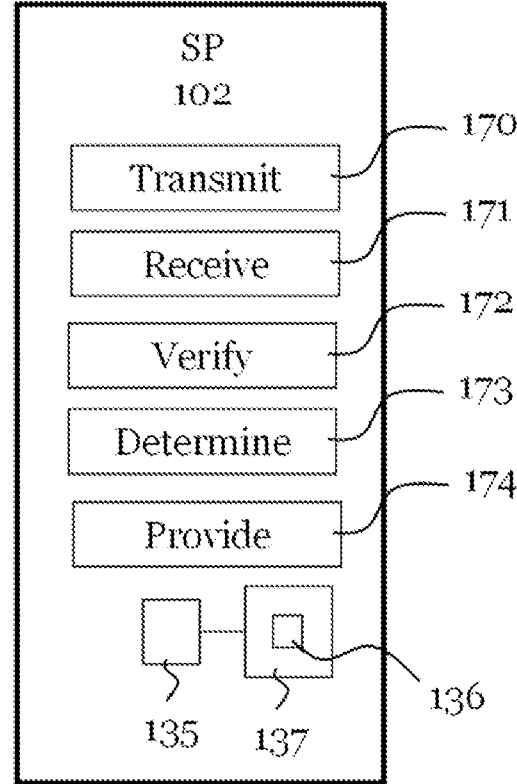
FIG. 11 illustrates a service-providing node according to an embodiment.

FIG. 11 illustrates a service-providing node (SP) 102 according to an embodiment. The steps of the method performed by the SN 102 of providing a service to a wireless communication device according to embodiments are in practice performed by a processing unit 135 embodied in the form of one or more microprocessors arranged to execute a computer program 136 downloaded to a suitable storage volatile medium 137 associated with the microprocessor, such as a Random Access Memory (RAM), or a non-volatile storage medium such as a Flash memory or a hard disk drive. The processing unit 135 is arranged to cause the SP 102 to carry out the method according to embodiments when the appropriate computer program 136 comprising computer-executable instructions is downloaded to the storage medium 137 and executed by the processing unit 135. The storage medium 137 may also be a computer program product comprising the computer program 136. Alternatively, the computer program 136 may be transferred to the storage medium 137 by means of a suitable computer program product, such as a Digital Versatile Disc (DVD) or a memory stick. As a further alternative, the computer program 136 may be downloaded to the storage medium 137 over a network. The processing unit 135 may alternatively be embodied in the form of a digital signal processor (DSP), an application specific integrated circuit (ASIC), a field-programmable gate array (FPGA), a complex programmable logic device (CPLD), etc.

The SP 102 comprises transmitting means 170 adapted to transmit a request for information indicating a position of the wireless communication device, receiving means 171 adapted to receive information indicating a position of the wireless communication device, the information having been provided with an indication of authenticity, verifying means 172 adapted to verify the authenticity of the received position information, determining means 173 adapted to determine if the position information allows the service to be provided, and providing means 174 adapted to provide the service to the wireless communication device.

The means 170-174 may comprise communication interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 12:
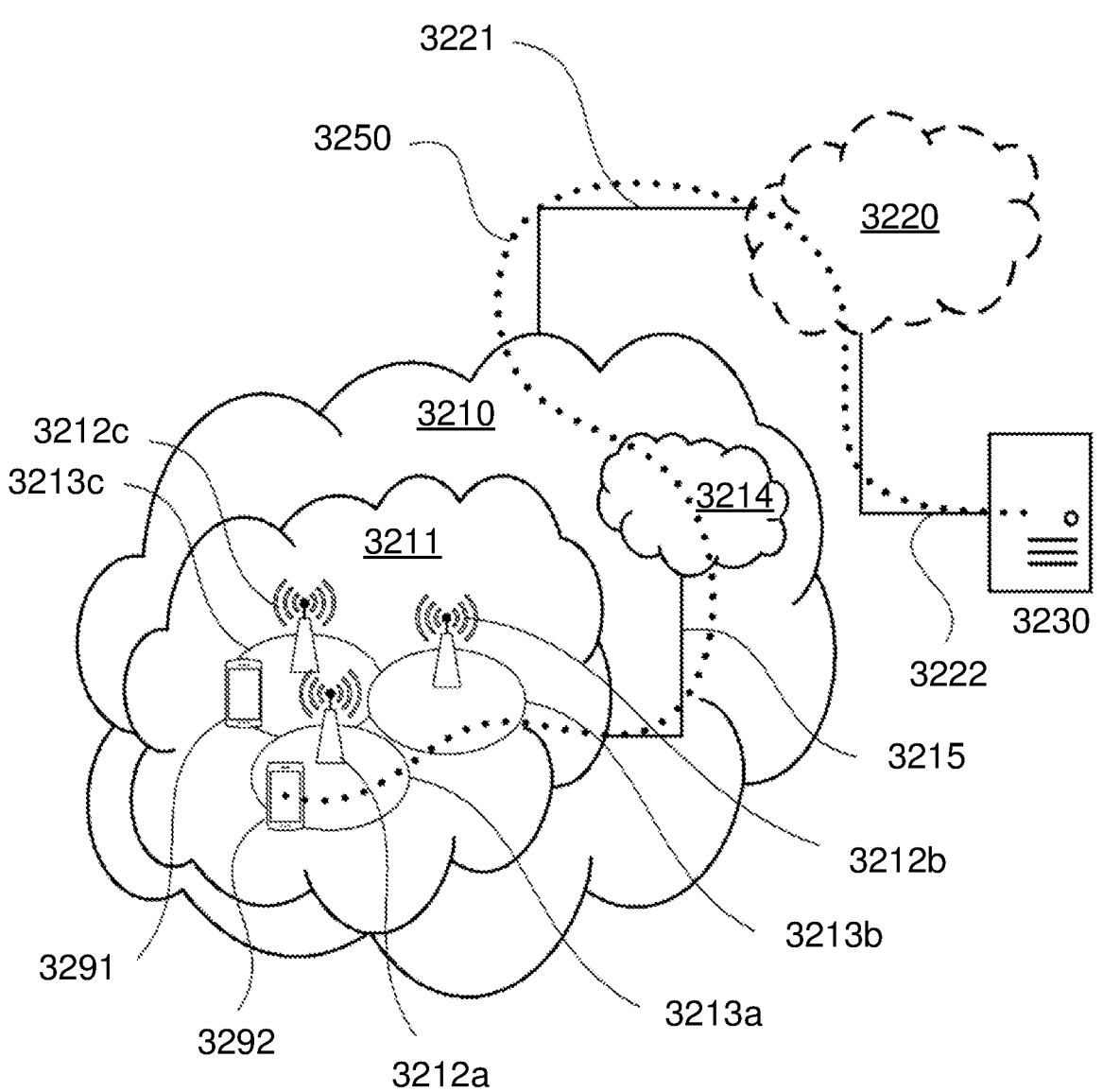
FIG. 12 illustrates a communication system in accordance with an embodiment.

With reference to FIG. 12, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. The base stations may embody the network node referenced to hereinabove as a location servers (LS) according to an embodiment, for instance by acquiring position information of a wireless communication device (WCD) from an E-SMLC via an MME.

A first user equipment (UE) 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212. As is understood, the UE(s) may embody the WCD according to an embodiment.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. Hence, the host computer may embody the service-providing node (SP) according to an embodiment as discussed hereinabove. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method of a service-providing node to provide a service to a wireless communication device, comprising:

transmitting a request for position information indicating a position of the wireless communication device;

receiving the position information indicating the position of the wireless communication device, the position information having been provided with an indication of authenticity;

receiving an identifier of a network node providing the position information;

verifying the authenticity of the position information received, wherein the service-providing node uses the identifier to identify the network node and uses a key associated with the network node to decrypt the position information provided with the indication of authenticity to verify the position of the wireless communication device;

determining that the position information allows the service to be provided; and in response to determining that the position information allows the service to be provided, providing the service to the wireless communication device.

2. The method of claim 1, wherein the request for the position information indicating the position of the wireless communication device is transmitted to the wireless communication device, and wherein the position information and the identifier of the network node having provided the indication of authenticity, is received from the wireless communication device.

3. The method of claim 1, wherein the request for the position information indicating the position of the wireless communication device is transmitted to the wireless communication device and the position information is received from the network node.

4. The method of claim 1, wherein the request for the position information indicating the position of the wireless communication device is transmitted to the network node and the position information is received from the network node.

5. The method of claim 4, further comprising:
receiving, from the wireless communication device, credentials required to receive the position information indicating the position of the wireless communication device; and
transmitting, to the network node, the request for the position information indicating the position of the wireless communication device and the credentials, wherein the position information indicating the position of the wireless communication device provided with an indication of authenticity is received, when the credentials are verified by the network node.

6. The method of claim 1, further comprising:
receiving, from the wireless communication device, a request for the service based on the position of the wireless communication device.

7. A service-providing node to provide a service to a wireless communication device comprising:
a processing unit; and
a memory containing instructions which, when executed by the processing unit, cause the service-providing node to:
transmit a request for position information indicating a position of the wireless communication device;
receive the position information indicating the position of the wireless communication device, the position information having been provided with an indication of authenticity;
receive an identifier of a network node which provides the position information;
verify the authenticity of the position information received, wherein the service-providing node uses the identifier to identify the network node and uses a key associated with the network node to decrypt the position information provided with the indication of authenticity to verify the position of the wireless communication device;
determine that the position information allows the service to be provided; and
in response to a determination that the position information allows the service to be provided, provide the service to the wireless communication device.

8. The service-providing node of claim 7 to transmit the request for the position information indicating the position of the wireless communication device to the wireless communication device and to receive the position information and the identifier of the network node having provided the indication of authenticity, from the wireless communication device.

9. The service-providing node of claim 7 to transmit the request for the position information indicating the position of the wireless communication device to the wireless communication device and to receive the position information from the network node.

10. The service-providing node of claim 7 to transmit the request for the position information indicating the position of the wireless communication device to the network node and to receive the position information from the network node.

11. The service-providing node of claim 10, further to:
receive, from the wireless communication device, credentials required to receive the position information indicating the position of the wireless communication device; and
transmit, to the network node, the request for the position information indicating the position of the wireless communication device and the credentials, wherein the position information indicating the position of the wireless communication device provided with an indication of authenticity is received, when the credentials are verified by the network node.

12. The service-providing node of claim 7, further to:
receive, from the wireless communication device, a request for the service based on the position of the wireless communication device.

13. A non-transitory computer-readable storage medium comprising instructions which, when executed by a processor, cause a service-providing node to provide a service to a wireless communication device by performing operations comprising:
transmitting a request for position information indicating a position of the wireless communication device;
receiving the position information indicating the position of the wireless communication device, the position information having been provided with an indication of authenticity;
receiving an identifier of a network node providing the position information;
verifying the authenticity of the position information received, wherein the service-providing node uses the identifier to identify the network node and uses a key associated with the network node to decrypt the position information provided with the indication of authenticity to verify the position of the wireless communication device;
determining that the position information allows the service to be provided; and
in response to determining that the position information allows the service to be provided, providing the service to the wireless communication device.

14. The non-transitory computer-readable storage medium of claim 13, wherein the request for the position information indicating the position of the wireless communication device is transmitted to the wireless communication device, and wherein the position information and the identifier of the network node having provided the indication of authenticity, is received from the wireless communication device.

15. The non-transitory computer-readable storage medium of claim 13, wherein the request for the position information indicating the position of the wireless communication device is transmitted to the wireless communication device and the position information is received from the network node.

16. The non-transitory computer-readable storage medium of claim 13, wherein the request for the position information indicating the position of the wireless communication device is transmitted to the network node and the position information is received from the network node.

17. The non-transitory computer-readable storage medium of claim 16, wherein the operations further comprising:

receiving, from the wireless communication device, credentials required to receive the position information indicating the position of the wireless communication device; and transmitting, to the network node, the request for the position information indicating the position of the wireless communication device and the credentials, wherein the position information indicating the position of the wireless communication device provided with an indication of authenticity is received, when the credentials are verified by the network node.

18. The non-transitory computer-readable storage medium of claim 13, wherein the operations further comprising:

receiving, from the wireless communication device, a request for the service based on the position of the wireless communication device.

\* \* \* \* \*